(12) United States Patent
Lo (10) Patent No.: US 9,413,218 B2
(45) Date of Patent: Aug. 9, 2016

(54) RESISTANCE ADJUSTMENT DEVICE FOR EXERCISER

(71) Applicant: Chiu-Hsiang Lo, Taichung (TW)

(72) Inventor: Chiu-Hsiang Lo, Taichung (TW)

(*) Notice: Subject to any disclaimer, the term of this patent is extended or adjusted under 35 U.S.C. 154(b) by 76 days.

(21) Appl. No.: 14/526,511

(22) Filed: Oct. 29, 2014

(65) Prior Publication Data

US 2016/0028298 A1  Jan. 28, 2016

(30) Foreign Application Priority Data

Jul. 24, 2014 (TW) .............................. 103213140 U (51) Int. Cl.
*A63B 21/00* (2006.01)
*H02K 49/04* (2006.01)
*A63B 22/06* (2006.01)
*A63B 23/04* (2006.01)

(52) U.S. Cl.
CPC ........ *H02K 49/046* (2013.01); *A63B 21/00192* (2013.01); *A63B 22/0605* (2013.01); *A63B 23/0476* (2013.01)

(58) Field of Classification Search
CPC ............. A63B 22/0605; A63B 21/225; A63B 21/00192; A63B 21/0053; A63B 21/012; A63B 21/4049; A63B 21/0052; A63B 21/22; A63B 2209/08; A63B 2220/36; F16D 2121/20; F16D 2129/065; F16D 2129/08; F16D 2121/14; Y10T 29/49012
USPC .............. 482/51, 57–65; 188/294, 322.5, 290
See application file for complete search history.

(56) References Cited

U.S. PATENT DOCUMENTS

| | | | | | |
|---|---|---|---|---|---|
| 3,451,674 | A | * | 6/1969 | Lichtneckert | A61B 5/221 188/184 |
| 4,826,150 | A | * | 5/1989 | Minoura | A63B 21/0051 310/103 |
| 5,147,265 | A | * | 9/1992 | Pauls | A63B 21/015 482/115 |
| RE34,479 | E | * | 12/1993 | Minoura | A63B 21/0051 482/6 |
| 5,848,953 | A | * | 12/1998 | Wei | A63B 21/0051 188/164 |
| 5,851,165 | A | * | 12/1998 | Wei | A63B 21/0051 188/164 |
| 6,273,845 | B1 | * | 8/2001 | Liou | A63B 21/0051 188/164 |
| 6,360,855 | B1 | * | 3/2002 | Szu-Yin | A63B 21/0051 188/161 |
| 6,729,448 | B2 | * | 5/2004 | Takahashi | E05F 5/003 188/290 |

(Continued)

*Primary Examiner* — Steve R Crow
*Assistant Examiner* — Andrew S Lo (57) ABSTRACT

An adjustment device includes a casing to which a movable member and two positioning members are movably connected. Two links are connected between the movable member and the positioning members. Each positioning member has a magnetic member connected thereto and the flywheel has a magnetic operation face. When the movable member moves from a second position to a first position, the links drive the positioning members and the magnetic members from a close-to-center position to an off-center position, and the flywheel cuts the magnetic field of the magnetic members to generate a first resistance to the driving device and the flywheel. When the movable member moves from the first position to the second position, the positioning members and the magnetic members move from the off-center position to the close-to-center position to generate a second resistance that is different from the first resistance.

9 Claims, 10 Drawing Sheets

(56) References Cited

U.S. PATENT DOCUMENTS

| | | | | |
|---|---|---|---|---|
| 7,018,324 B1* | 3/2006 | Lin | .................... | A63B 21/0052 188/158 |
| 8,701,843 B2* | 4/2014 | Kao | .................... | A63B 21/0051 188/161 |
| 2001/0003110 A1* | 6/2001 | Lay | .................... | A63B 21/0051 482/57 |
| 2003/0064863 A1* | 4/2003 | Chen | .................. | A63B 21/0051 482/51 |
| 2003/0087731 A1* | 5/2003 | Huang | ............... | A63B 21/0051 482/57 |
| 2003/0158016 A1* | 8/2003 | Kolda | ................. | A63B 21/0051 482/61 |
| 2003/0195089 A1* | 10/2003 | Schroeder | .............. | A63B 21/15 482/61 |
| 2004/0166996 A1* | 8/2004 | Kolda | ................. | A63B 21/0051 482/62 |
| 2005/0003934 A1* | 1/2005 | Wu | .................... | A63B 21/0051 482/64 |
| 2008/0261775 A1* | 10/2008 | Chang | ................ | A63B 21/0051 482/5 |
| 2009/0029832 A1* | 1/2009 | Sartore | ............. | A63B 21/0051 482/63 |
| 2014/0171272 A1* | 6/2014 | Hawkins, III | ...... | A63B 24/0087 482/61 |

* cited by examiner

RESISTANCE ADJUSTMENT DEVICE FOR EXERCISER

BACKGROUND OF THE INVENTION

1. Fields of the Invention

The present invention relates to an adjustment device, and more particularly, to an adjustment device using magnetic members and movable members to adjust the resistance of an exerciser.

2. Descriptions of Related Art

The conventional exercisers comprise a driving device and a magnetic resistance device, the magnetic resistance device has a flywheel and a magnetic member. The user operates the driving device to output a force to drive the flywheel. The magnetic operation between the magnetic operation face of the flywheel and the magnetic member generates a resistance to the driving device, and the user overcomes the resistance to exercise the muscles. U.S. Pat. Nos. 5,145,480, 5,310,392, 5,324,242 and 6,569,063 disclose a similar magnetic resistance device which has a magnetic member and a movable device. The movable device moves the magnetic member to close the flywheel to cause magnetic field cutting to generate the resistance. There is a movable block with a U-shaped cross section and two magnetic members are connected on two extensions of the U-shaped movable block. The two magnetic members face the two opposite sides of the flywheel. However, in order to prevent the recessed portion of the U-shaped movable block from contacting the flywheel, the distance that the magnetic members can move relative to the flywheel has to be narrowed or reduced. Alternatively, the size of U-shaped movable block has to be increased, and this affects the manufacturing cost. Besides, the movable device is not well arranged so that the movement of the magnetic members is not smooth as desired.

The present invention intends to provide an adjustment device to eliminate the shortcomings mentioned above.

SUMMARY OF THE INVENTION

The present invention relates to an adjustment device of an exerciser, wherein the adjustment device comprises a casing, a movable member, two positioning members, two links, a flywheel and magnetic members. The movable member and the two positioning members are movably connected to the casing. The two links are connected between the movable member and the positioning members. Each positioning member has the magnetic member connected thereto which is located close to the magnetic operation face of the flywheel. When the movable member moves from a second position to a first position, the links drive the positioning members and the magnetic members from a close-to-center position to an off-center position, and the flywheel cuts the magnetic field of the magnetic members to generate a first resistance to the driving device and the flywheel. When the movable member moves from the first position to the second position, the positioning members and the magnetic members move from the off-center position to the close-to-center position to generate a second resistance that is different from the first resistance.

The primary object of the present invention is to provide an adjustment device that adjusts the magnetic resistance of an exerciser smoothly.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the adjustment device of the present invention is installed to an exerciser such as a bike exerciser, and comprises a casing 10, a movable member 11, two positioning members 12, four links 13, a flywheel 14 and multiple magnetic members 15.

Figure 1:
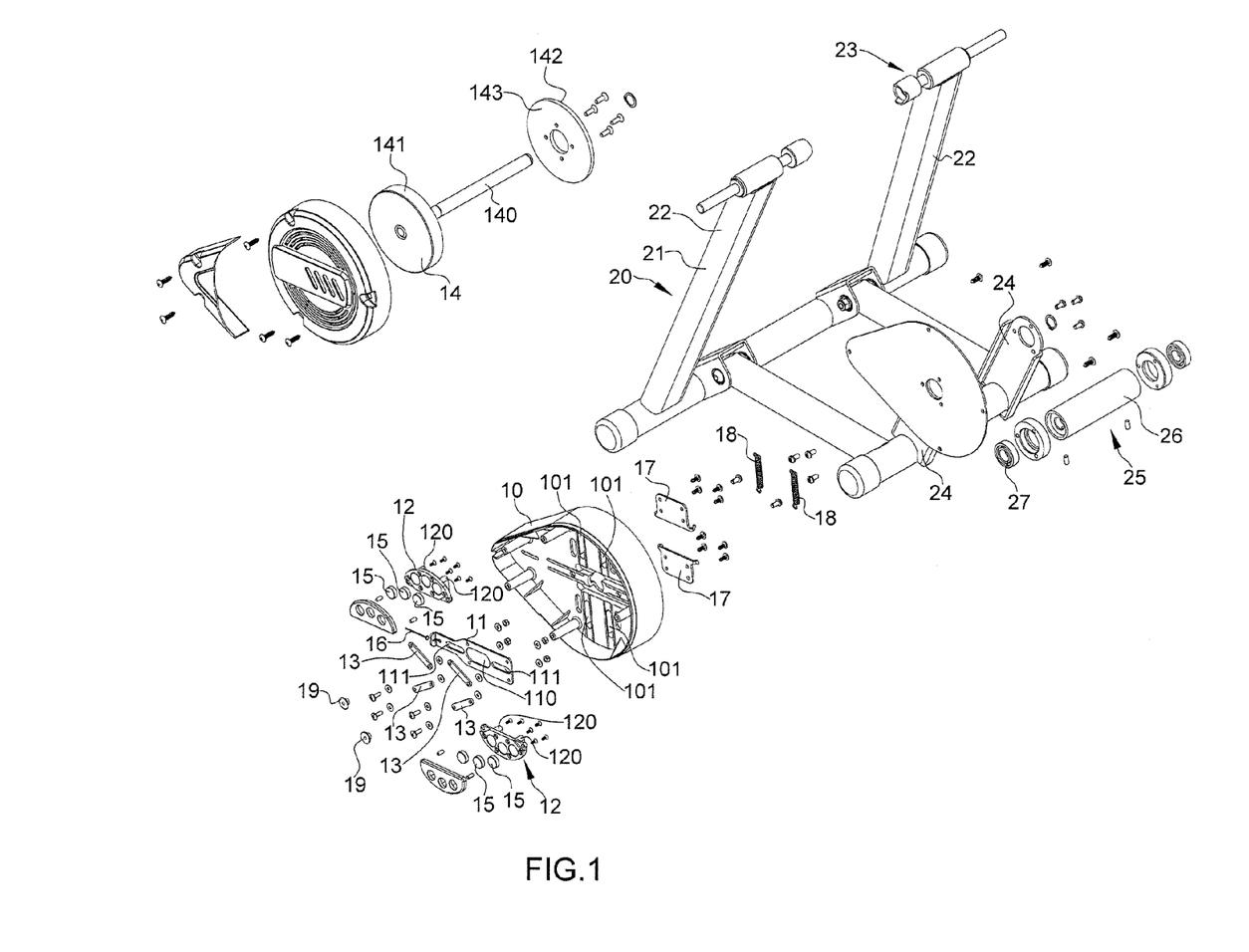
FIG. 1 is an exploded view of the adjustment device of the present invention.
Figure 2:
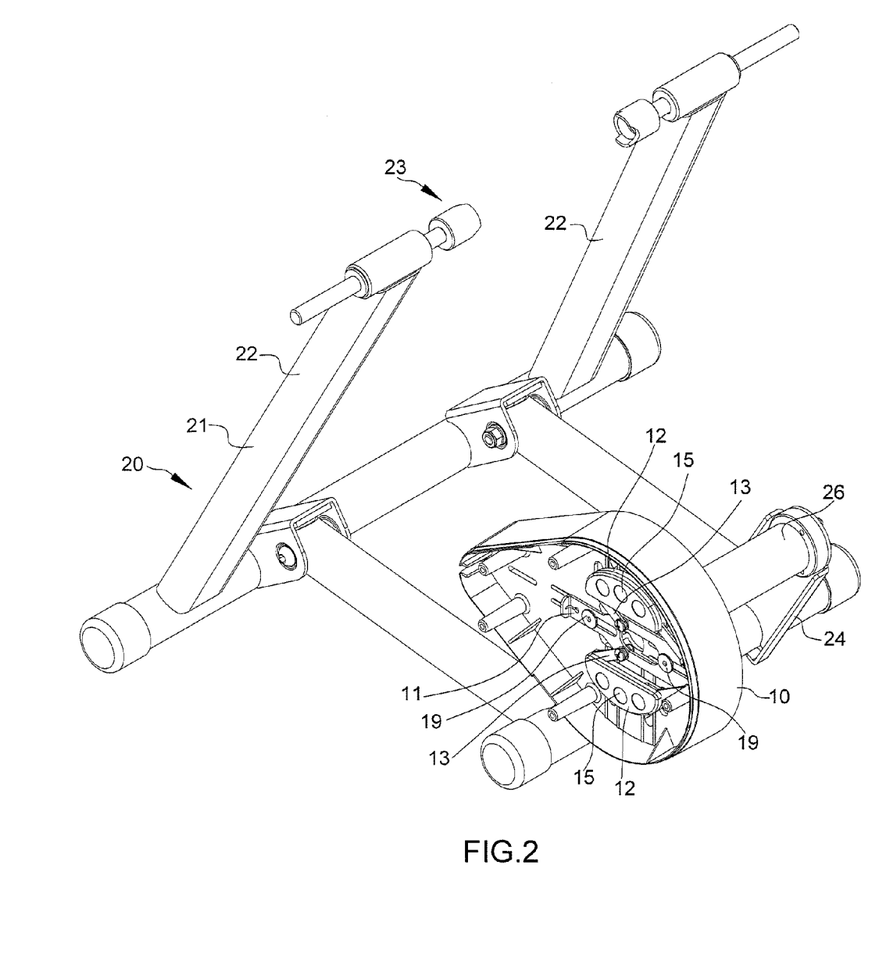
FIG. 2 is a perspective view to show that the adjustment device of the present invention is installed to a bike exerciser wherein the flywheel is not yet installed.
Figure 3:
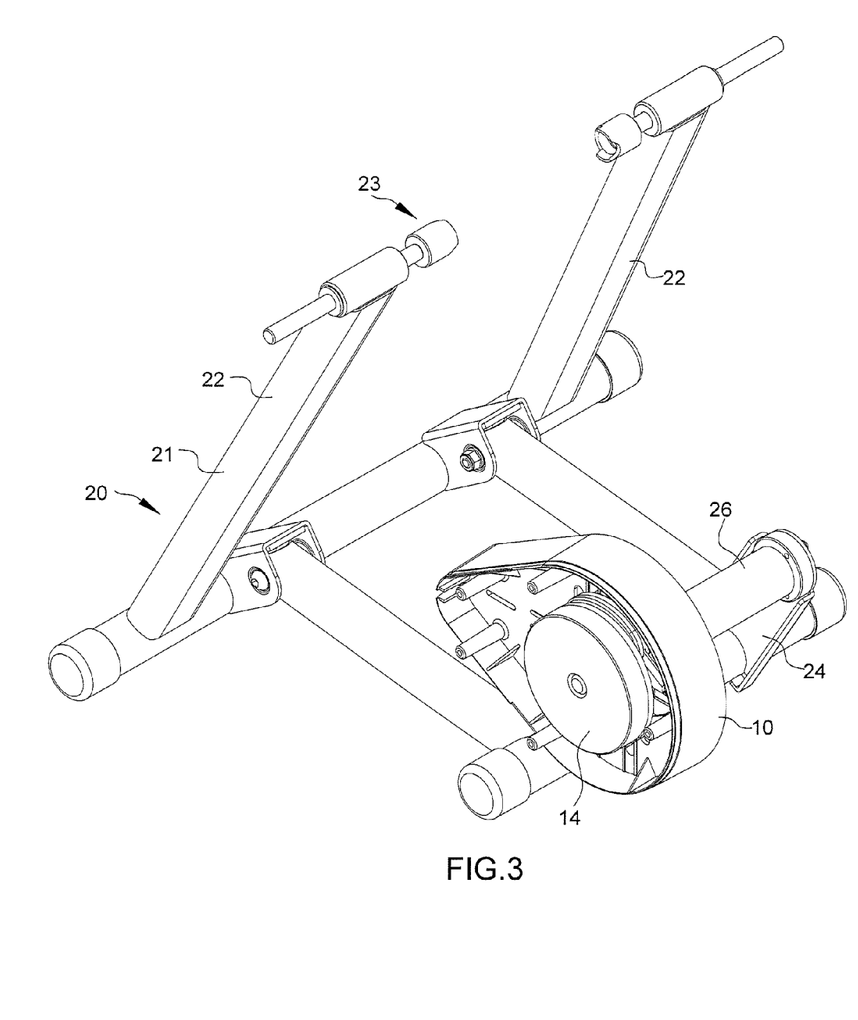
FIG. 3 is a perspective view to show that the adjustment device of the present invention is installed to a bike exerciser wherein the flywheel is installed.
Figure 4:
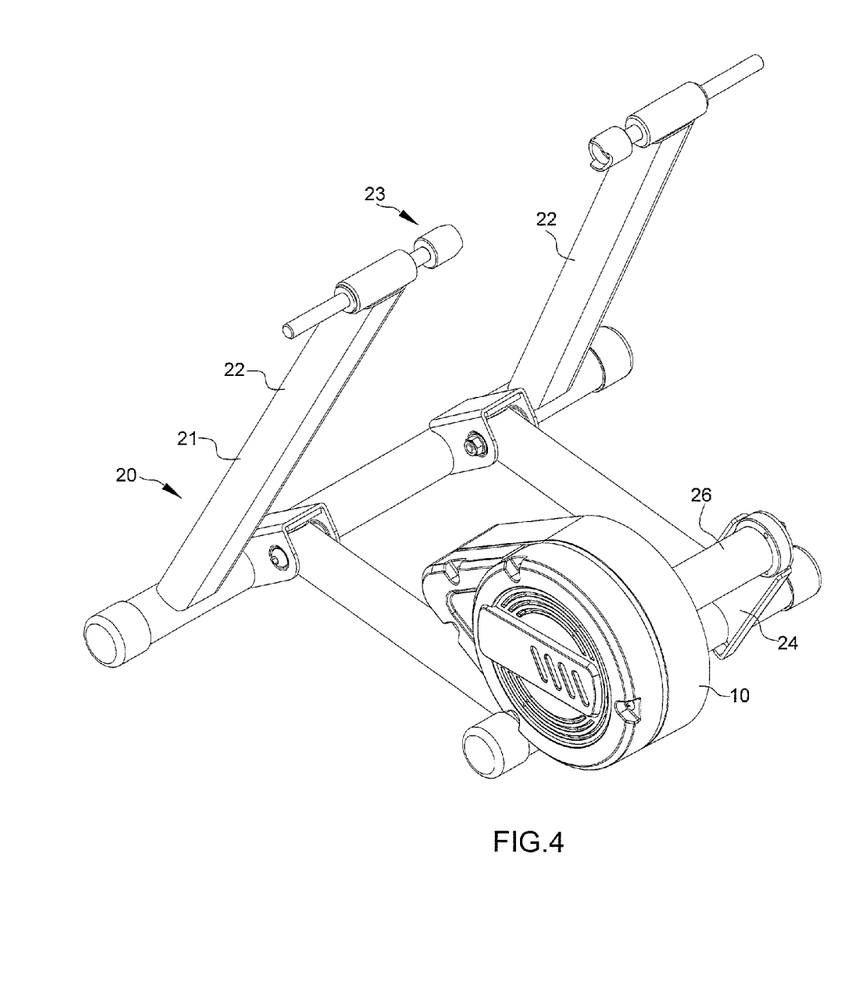
FIG. 4 is a perspective view to show that the adjustment device of the present invention is installed to a bike exerciser.
Figure 5:
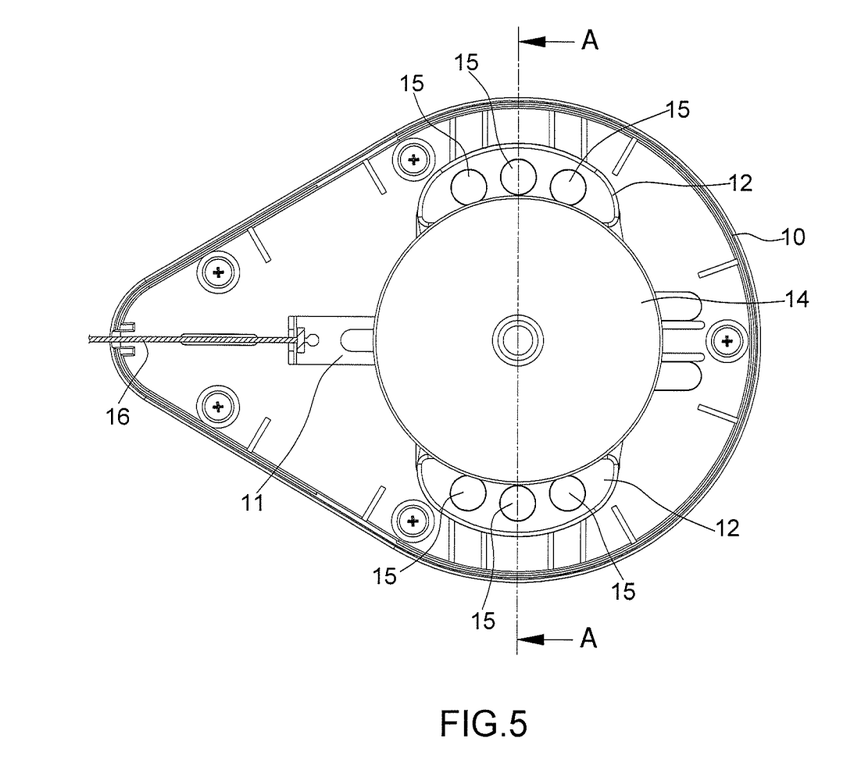
FIG. 5 shows that the positioning members and the magnetic members are located off from the center of the magnetic operation face of the flywheel.
Figure 6:
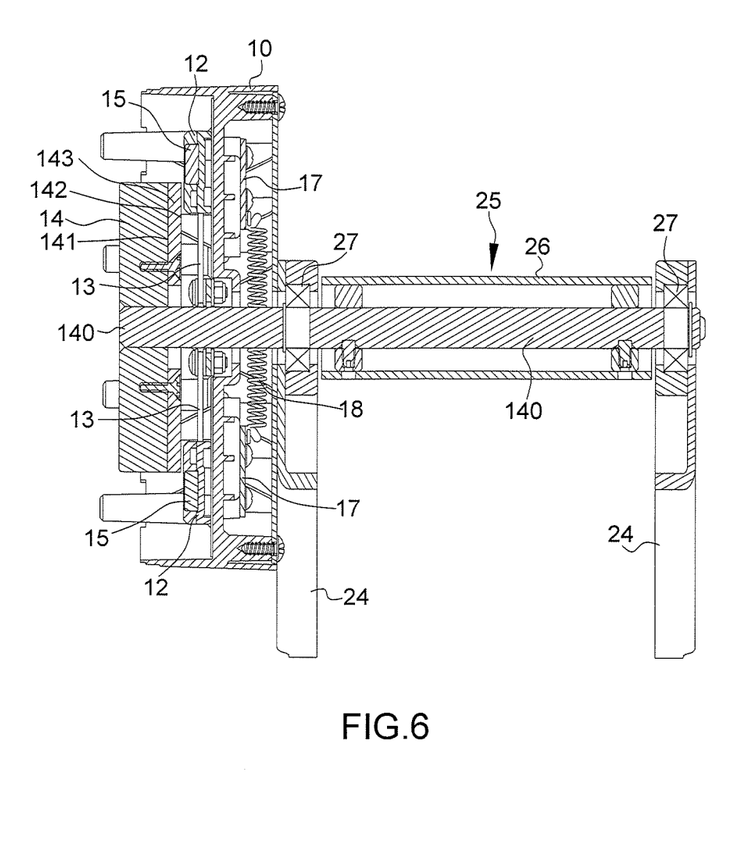
FIG. 6 is a cross sectional view, taken along line A-A in FIG. 5.
Figure 7:
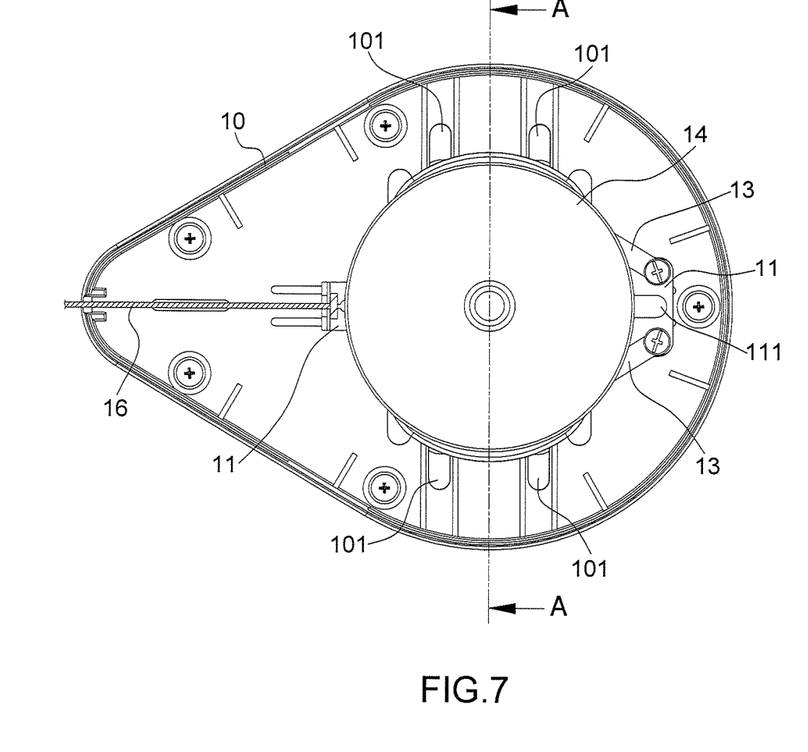
FIG. 7 shows that the positioning members and the magnetic members are located close to the center of the magnetic operation face of the flywheel.
Figure 8:
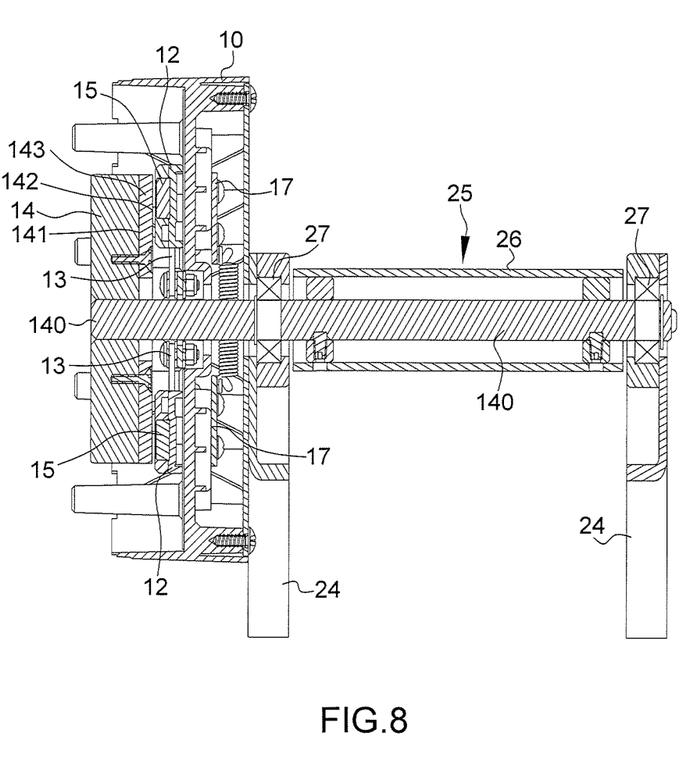
FIG. 8 is a cross sectional view, taken along line A-A in FIG. 7.
Figure 9:
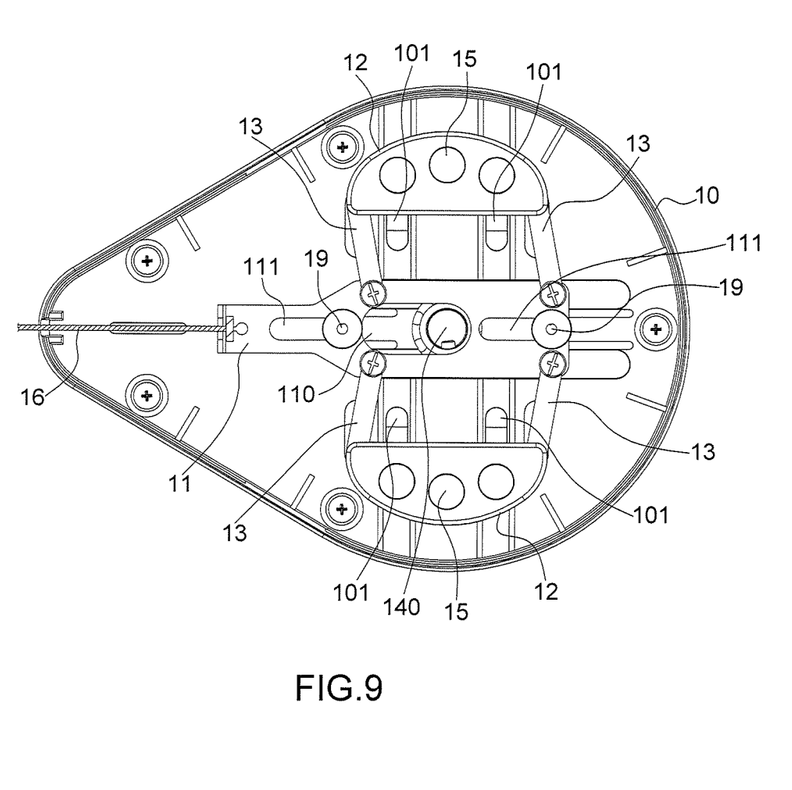
FIG. 9 is another view to show that the positioning members and the magnetic members are located off from the center of the magnetic operation face of the flywheel.
Figure 10:
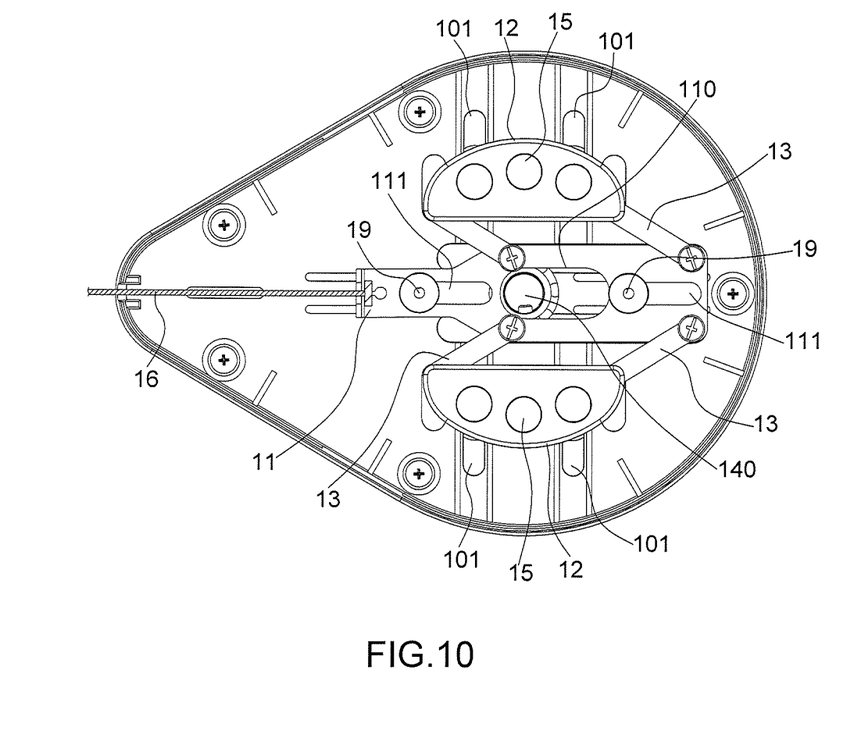
FIG. 10 is another view to show that the positioning members and the magnetic members are located close to the center of the magnetic operation face of the flywheel.

The casing 10 is connected to a base 21 of the bike exerciser 20 and the movable member 11 is movably connected to the casing 10. The movable member 11 has one end connected with a cable 16 and an elongate slot 110 is defined in the mediate portion thereof. The two positioning members 12 are movably connected to the casing 10 and each of the positioning members 12 is pivotably connected to the movable member 11 by two of the links 13. The flywheel 14 has a shaft 140 connected to the center there and the shaft 140 is rotatably connected to the base 21 of the bike exerciser 20. In the drawing, the shaft 140 rotatably extends through the casing 10 and is connected to the base 21. The shaft 140 extends through the elongate slot 110 of the movable member 11 and is connected with a driving device 25. The driving device 25 provides a force to the shaft 140 so as to drive the flywheel 14 when the user operates the bike exerciser 20. The bike exerciser 20 has the base 21 to which two front posts 22 and two rear posts 24 are connected. A positioning device 23 is connected between the two front posts 22. One of the two rear posts 24 is connected to the casing 10. The positioning device 23 is connected with a wheel axle. The driving device 25 has a socket 26 which is rotatably connected to the shaft 140 by bearings 27 which can be one-direction bearings. The socket 26 is rotatably connected to the two rear posts 24. A wheel connected to the wheel axle contacts the socket 26 which is rotated when the wheel rotates, the socket 26 drives the shaft 140 and the flywheel 14. The flywheel 14 has a magnetic operation face 142 formed on one side 141 thereof the flywheel 14, the magnetic operation face 142 is connected to an Aluminum disk 143 which is connected to the side 141 of the flywheel 14. Each positioning member 12 has three magnetic members 15 connected thereto which are located close to the magnetic operation face 142. The casing 10 has four parallel elongate holes 101 and the axis of each of the elongate holes 101 is parallel to a first radial line of the flywheel 14. Two of the elongate holes 101 are located on one side of the movable member 11 and the other two elongate holes 101 are located on the other side of the movable member 11. Each of the two positioning members 12 has two protrusions 120 extending therefrom and the two protrusions 120 respectively extend through the two elongate holes 101 corresponding thereto. When a driving force is applied to the movable member 11 via the cable 16 as shown in FIG. 5, the movable member 11 moves from a second position to a first position. The two positioning members 12 and the magnetic members 15 are moved from the close-to-center position that is located close to the center of the magnetic operation face 142 to the off-center position that is located away from the center of the magnetic operation face 142 by the links 13. The protrusions 120 move linearly in the elongate holes 101. The two positioning members 12 and the magnetic members 15 are moved linearly relative to the center of the magnetic operation face 142.

Each protrusion 120 has a board 17 connected to the distal end thereof, the casing 10 is located between the positioning members 12 and the boards 17. Two springs 18 are connected between the two boards 17. When the links 13 drive the two positioning members 12 from the close-to-center position to the off-center position, the springs 18 are extended and the two positioning members 12 are moved away from each other. When the springs 18 are released, the two positioning members 12 move from the off-center position to the close-to-center position. The two positioning members 12 are located symmetrically to the center of the magnetic operation face 142.

When the movable member 11 moves from the second position to the first position, the positioning members 12 are moved away from each other relative to the center of the magnetic operation face 142. The two positioning members 12 move along the first radial line of the flywheel 14. The casing 10 has two pins 19 connected thereto. The movable member 11 has two elongate guide slots 111. The two pins 19 respectively extend through the two elongate guide slots 111. When the movable member 11 moves between the second position and the first position, and the positioning members 12 move between the close-to-center position and the off-center position, the pins 19 moves along the elongate guide slots 111 to move the movable member 11 linearly. The movable member 11 moves along a second radial line of the flywheel 14. The casing 10 accommodates the movable member 11, the links 13, the positioning members 12 and the flywheel 14.

As shown in FIGS. 1 to 6, when the driving force is applied to the cable 16 which passes the driving force to the movable member 11, the movable member 11 moves from the second position to the first position, the positioning members 12 and the magnetic members 15 are moved to the two respective off-center positions by the links 13 of the movable member 11. The magnetic operation face 142 cuts the magnetic field of the magnetic members 15 and generates a first resistance to the driving device 25.

When a return force is applied to the movable member 11 to move the movable member 11 from the first position to the second position, the positioning members 12 and the magnetic members 15 are moved from the two off-center positions to the two close-to-center positions by the links 13, the magnetic operation face 142 cuts the magnetic field of the magnetic members 15 to generate a second resistance that is different from the first resistance to the driving device 25. When observing from the axial direction of the flywheel 14, the overlapped area between the magnetic members 15 at the off-center position and the magnetic operation face 142 is smaller than the overlapped area between the magnetic members 15 at the close-to-center position and the magnetic operation face 142, so that the first resistance is smaller than the second resistance. As shown in FIG. 5, there is no overlapped area formed between the magnetic members 15 and the magnetic operation face 142, so that the first resistance is zero.

While we have shown and described the embodiment in accordance with the present invention, it should be clear to those skilled in the art that further embodiments may be made without departing from the scope of the present invention.

What is claimed is:

1. An adjustment device comprising:
   a casing;
   a movable member movably connected to the casing;
   at least one positioning member movably connected to the casing;
   at least one link pivotably connected between the movable member and the at least one positioning member;
   a flywheel having a magnetic operation face formed on a side of the flywheel, a shaft connected to a center of the flywheel and being adapted to be connected to an exerciser, the shaft connected with a driving device which inputs a force to the shaft so as to drive the flywheel;
   at least one magnetic member connected to the at least one positioning member and located close to the magnetic operation face;
   wherein when a driving force is applied to the movable member to move the movable member from a second position to a first position, the at least one positioning member and the at least one magnetic member are moved from at least one close-to-center position that is located close to a center of the magnetic operation face to at least one off-center position that is located away from the center of the magnetic operation face by the at least one link, the magnetic operation face cuts a magnetic field of the at least one magnetic member to generate a first resistance to the driving device;
   wherein when a return force is applied to the movable member to move the movable member from the first position to the second position, the at least one positioning member and the at least one magnetic member are moved from the at least one off-center position that is located away from the center of the magnetic operation face to the at least one close-to-center position that is located close to a center of the magnetic operation face by the at least one link, the magnetic operation face cuts a magnetic field of the at least one magnetic member to generate a second resistance that is different from the first resistance to the driving device, and
   wherein the casing having at least one pin connected thereto, the movable member having at least one elongate guide slot, the at least one pin extending through the at least one elongate guide slot, wherein when the movable member moves from the second position to the first position, and the at least one positioning member moves between the close-to-center position and the off-center position, the at least one pin moves along the at least one elongate guide slot to move the movable member linearly, the movable member moves along a second radial line of the flywheel.

2. The adjustment device as claimed in claim 1, wherein there are two positioning members which are connected to the movable member by two links, the at least one magnetic member is connected to each positioning member, the casing has multiple elongate holes, each positioning member has at least one protrusion which extends through the elongate hole corresponding thereto, when the movable member moves from the second position to the first position, the links drive the two positioning members from the close-to-center position to the off-center position, the protrusions move along the two elongate holes, the positioning members move linearly relative to the center of the magnetic operation face.

3. The adjustment device as claimed in claim 2, wherein each of the positioning members has two protrusions which respectively extend through the two elongate holes, each protrusion has a board connected to a distal end thereof, the casing is located between the positioning members and the boards, at least one spring is connected between the two boards, when the links drive the two positioning members from the close-to-center position to the off-center position, the spring is extended, when the spring is released, the two positioning members move from the off-center position to the close-to-center position, an axis of each of the elongate holes is parallel to a first radial line of the flywheel, the two positioning members move along the first radial line of the flywheel.

4. The adjustment device as claimed in claim 3, wherein there are two springs connected between the two boards.

5. The adjustment device as claimed in claim 2, wherein the two positioning members are located symmetrically to the center of the magnetic operation face, when the movable member moves from the second position to the first position, the links move the two positioning members in two opposite directions relative to the center of the magnetic operation face.

6. The adjustment device as claimed in claim 1, wherein the at least one positioning member is connected to at least one spring, when the at least one positioning member moves from the close-to-center position to the off-center position, the at least one spring is extended, when the spring is released, the at least one positioning member moves from the off-center position to the close-to-center position by a force from the at least one spring.

7. The adjustment device as claimed in claim 1, wherein the movable member is connected with a cable and the driving force is applied to the movable member via the cable.

8. The adjustment device as claimed in claim 1, wherein the movable member has an elongate slot defined in a mediate portion thereof, the shaft extends through the elongate slot.

9. The adjustment device as claimed in claim 1, wherein the exerciser is a bike exerciser which has a base, a positioning device and the casing are connected to the base, the positioning device is connected with a wheel axle, the driving device has a socket which is rotatably connected to the shaft by bearings, a wheel connected to the wheel axle contacts the socket which is rotated when the wheel rotates, the socket drives the shaft and the flywheel.

* * * * *